(12) United States Patent
Horiguchi

(10) Patent No.: US 11,240,393 B2
(45) Date of Patent: Feb. 1, 2022

(54) IMAGE READING APPARATUS FOR READING AN IMAGE OF A DOCUMENT, AND IMAGE FORMING APPARATUS INCLUDING THE SAME

(71) Applicant: KYOCERA Document Solutions Inc., Osaka (JP)

(72) Inventor: Yasuyuki Horiguchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/064,767

(22) Filed: Oct. 7, 2020

(65) Prior Publication Data

US 2021/0127025 A1   Apr. 29, 2021

(30) Foreign Application Priority Data

Oct. 29, 2019 (JP) .............................. JP2019-196476

(51) Int. Cl.
*H04N 1/00* (2006.01)

(52) U.S. Cl.
CPC ..... *H04N 1/00689* (2013.01); *H04N 1/00702* (2013.01); *H04N 1/00737* (2013.01); *H04N 1/00745* (2013.01); *H04N 1/00777* (2013.01)

(58) Field of Classification Search
None
See application file for complete search history.

(56) References Cited

U.S. PATENT DOCUMENTS

| | | | | |
|---|---|---|---|---|
| 6,166,394 | A | * | 12/2000 | Rubscha ............ H04N 1/00737 250/235 |
| 7,692,818 | B2 | * | 4/2010 | Futami .................. H04N 1/125 358/3.26 |
| 9,270,837 | B1 | * | 2/2016 | Whitesell ........... H04N 1/00018 |
| 9,942,432 | B2 | * | 4/2018 | de Echaniz .......... H04N 1/0032 |
| 10,404,891 | B2 | * | 9/2019 | Ito ...................... H04N 1/00806 |
| 2014/0300938 | A1 | * | 10/2014 | Oosaki ............... H04N 1/00655 358/498 |
| 2016/0134777 | A1 | * | 5/2016 | Horiguchi ............ H04N 1/1235 358/1.12 |
| 2020/0329158 | A1 | * | 10/2020 | Takura ............... H04N 1/00087 |

FOREIGN PATENT DOCUMENTS

JP   2013-143715   7/2013

* cited by examiner

*Primary Examiner* — Miya J Williams
(74) *Attorney, Agent, or Firm* — Lex IP Meister, PLLC

(57) ABSTRACT

An image reading apparatus includes a document feeder, a reading unit configured to read an image of a document fed by the document feeder, a facing member positioned to face the reading unit via a document feeding path, and a detection processing unit configured to perform area detection processing for detecting an area of the document with respect to a read image obtained by the reading unit. The facing member includes a white portion and a gray portion. The reading unit selectively performs normal reading for reading the image of the document with the white portion of the facing member as a background and auto-crop reading for reading the image of the document with the gray portion of the facing member as the background. The detection processing unit performs the area detection processing only in the auto-crop reading.

8 Claims, 6 Drawing Sheets

IMAGE READING APPARATUS FOR READING AN IMAGE OF A DOCUMENT, AND IMAGE FORMING APPARATUS INCLUDING THE SAME

INCORPORATION BY REFERENCE

This application is based upon and claims the benefit of priority from the corresponding Japanese Patent Application No. 2019-196476 filed on Oct. 29, 2019, the entire contents of which are incorporated herein by reference.

The present disclosure relates to an image reading apparatus for reading images of documents fed by a document feeder, and an image forming apparatus including the image reading apparatus.

BACKGROUND

There are two types of document image reading systems in the image reading apparatus, namely, fixed document reading system and fed document reading system. The fixed document reading system is a method of reading a document image by placing a document on a contact glass, pressing the document against the contact glass by a platen mat, a document feeder, or the like, and scanning the reading unit. On the other hand, the fed document reading system is a method in which a reading unit is fixed at a predetermined position and a document image is read while the document is fed on the reading unit. In the fed document reading system, if a difference occurs between the document feeding speed and the reading timing due to the influence of the thickness and the surface condition of the document, the document area cannot be read properly.

For example, when the fed document reading system is adopted, a gray background member is arranged so as to face the reading unit, the background member is started to be read before the document reaches the reading position, the background member is read even after the document has passed through the reading position, and the document area is specified by discriminating areas having different densities (the document area and the background member area) in the read image.

However, when the document area is specified from the read image by the density difference between the document area and the background member area in the fed document reading system, an amount of data to be read increases and it takes time for data processing for determining (detecting) the document area. Thus, the productivity (reading efficiency) at the time of continuous reading is lowered.

On the other hand, if the above-described data processing is stopped in order to improve the productivity, for example, when the document size and the reading size are different from each other (for example, when the document size is A5 and the reading size is A4), gray data of the background member is included in an area other than the document in the read image, and an extra background color is given to the read image. As a result, at the time of printing based on the read image, areas other than the document are printed in gray, and unnecessary toner is wasted in areas other than the document.

SUMMARY

An image reading apparatus according to one aspect of the present disclosure includes a document feeder for feeding documents, a reading unit for reading an image of the document fed by the document feeder, a facing member positioned to face the reading unit via a feeding path of the document, and a detection processing unit for performing area detection processing for detecting an area of the document with respect to a read image obtained by the reading unit reading the image of the document with the facing member as a background. The facing member has a white portion in which a surface is white and a gray portion in which a surface is gray. The reading unit selectively performs normal reading for reading the image of the document with the white portion of the facing member as the background and auto-crop reading for reading the image of the document with the gray portion of the facing member as the background. The detection processing unit performs the area detection processing only in the auto-crop reading among the normal reading and the auto-crop reading.

The objects, features, and advantages of the present disclosure will become more apparent from the detailed description below. Reference is now made to the accompanying drawings, in which preferred embodiments of the present disclosure are illustrated as an example.

DETAILED DESCRIPTION

[Configuration of Image Forming Apparatus]

Figure 1:
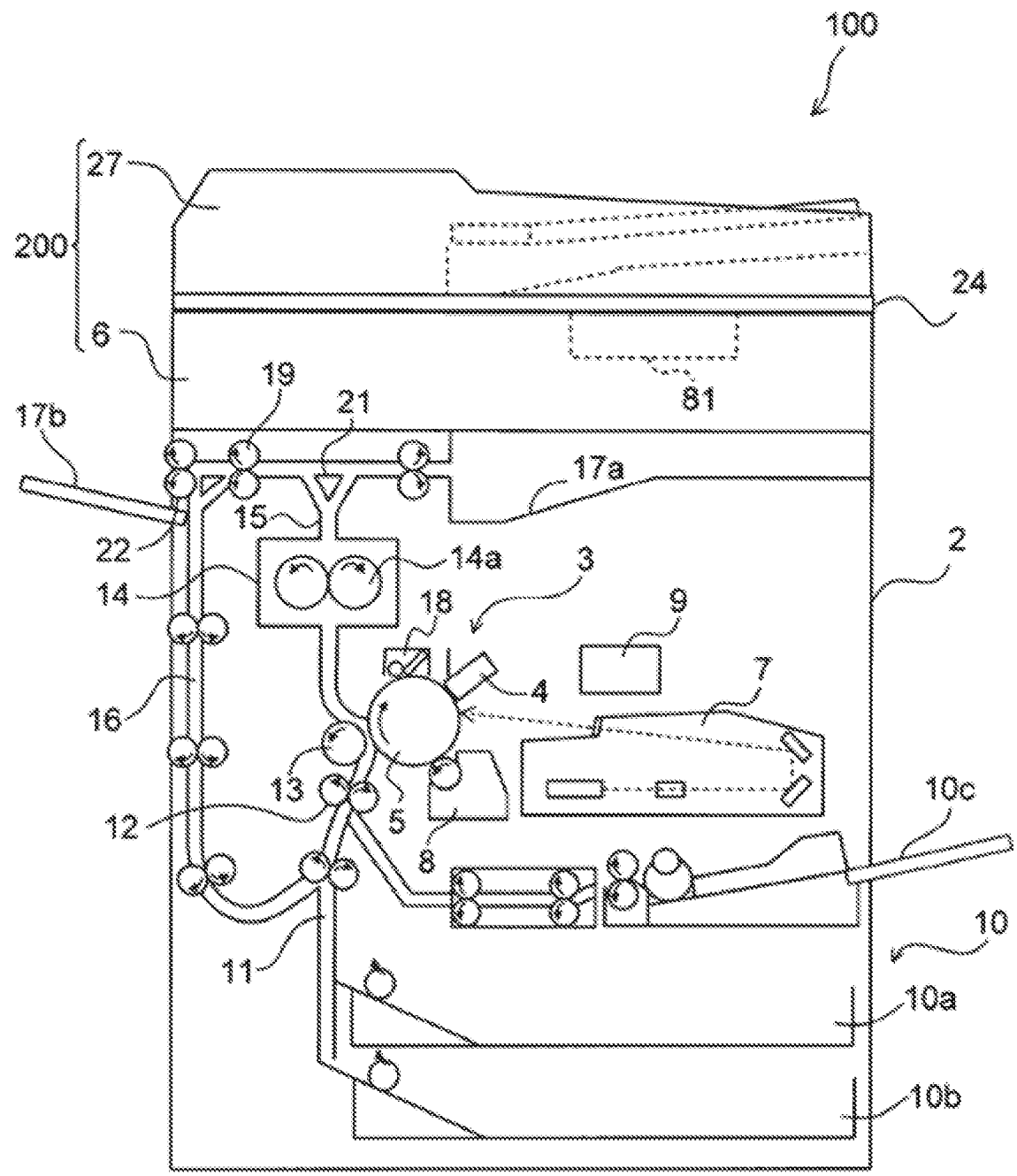
FIG. 1 is an explanatory diagram illustrating a schematic configuration of an image forming apparatus according to an embodiment of the present disclosure.

Embodiments of the present disclosure will be described below with reference to the drawings. FIG. 1 is an explanatory diagram illustrating a schematic configuration of an image forming apparatus 100 according to the present embodiment. The image forming apparatus 100 is, for example, a digital multi-function peripheral. When the image forming apparatus 100 performs a printing operation, the image reading unit 6 reads an image of a document and acquires data of a read image (read data). In an image forming unit 3 in an apparatus main body 2, an image is formed on a recording medium (for example, a sheet of paper), based on the read data acquired by the image reading unit 6.

More specifically, in the image forming unit 3, the photosensitive drum 5 rotating in clockwise direction in the figure is uniformly charged by a charging unit 4. Then, an electrostatic latent image based on the read data acquired by the image reading unit 6 is formed on the photosensitive drum 5 by a laser beam from the exposure unit 7 (laser scanning unit or the like). A developing agent (hereinafter referred to as toner) is attached to the formed electrostatic latent image by a developing unit 8 to form a toner image. The toner is supplied to the developing unit 8 from a toner container 9.

A sheet is fed from a sheet feeding mechanism 10 to the image forming unit 3 via a sheet feeding path 11 and a pair of registration rollers 12, toward the photosensitive drum 5 on which the toner image is formed as described above. When the fed sheet passes through a nip portion between the photosensitive drum 5 and a transfer roller 13 (image transfer portion), the toner image on the surface of the photosensitive drum 5 is transferred onto the sheet. Then, the sheet on which the toner image is transferred is separated from the photosensitive drum 5, and is fed to a fixing unit 14 having a pair of fixing rollers 14a to fix the toner image on the sheet. The sheet passing through the fixing unit 14 is fed to a sheet feeding path 15 branched in a plurality of directions. The sheets are distributed in the feeding directions by the path switching mechanisms 21 and 22 having a plurality of path switching guides provided at the branch points of the sheet feeding path 15, and are discharged as they are (or after being sent to a reverse feeding path 16 and subjected to double-sided copying) to the sheet discharge section including a first discharge tray 17a and a second discharge tray 17b.

Specifically, the sheet feeding path 15 is configured so as to be first branched to the left and right sides on the downstream side of the pair of fixing rollers 14a, and one path (path branching to the right in FIG. 1) communicates with the first discharge tray 17a. The other path (a path branched leftward in FIG. 1) is bifurcated via a pair of transfer rollers 19, and one path (a path branched leftward in FIG. 1) is configured to communicate with the second discharge tray 17b. On the other hand, the other path (a path branched downward in FIG. 1) is configured to communicate with the reverse feeding path 16.

Further, although not shown, a static eliminator for removing residual charge on the surface of the photosensitive drum 5 is provided on the downstream side of a cleaning device 18 with respect to the rotational direction of the photosensitive drum 5. Further, the sheet feeding mechanism 10 is detachably attached to the apparatus main body 2. The sheet feeding mechanism 10 includes a plurality of sheet feeding cassettes 10a and 10b for storing sheets, and a stack bypass (manual feed tray) 10c provided above the sheet feeding cassettes, and these members are connected to the image forming unit 3 including the photosensitive drum 5, the developing unit 8, and the like, via the sheet feeding path 11.

The image reading unit 6 is disposed on the upper part of the apparatus main body 2. A platen (document presser) 24 for pressing and holding a document placed on a contact glass 25 (see FIG. 3) of the image reading unit 6 is openably and closably provided on the upper surface of the apparatus main body 2, and a document feeder 27 is attached to the platen 24. The document feeder 27 feeds the document placed on a document feeding tray 29 (see FIG. 2) and supplies the document to the contact glass 25 of the image reading unit 6, thereby causing the image reading unit 6 to read the image of the document. The document feeder 27 and the image reading unit 6 constitute an image reading apparatus 200 of the present embodiment.

[Details of Image Reading Apparatus]

Figure 2:
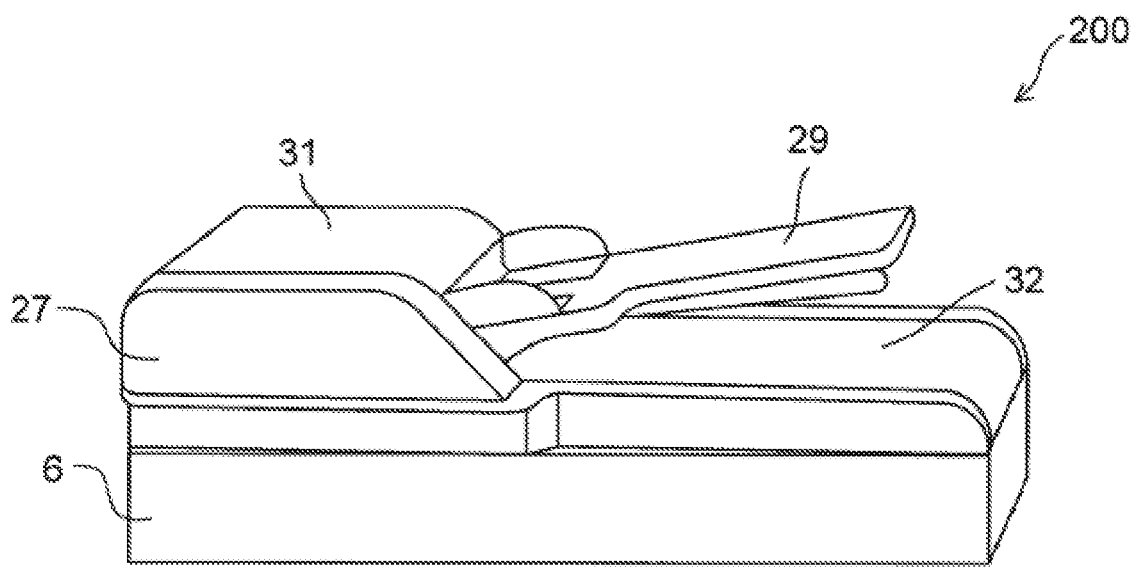
FIG. 2 is a perspective view illustrating an appearance of an image reading apparatus included in the image forming apparatus.
Figure 3:
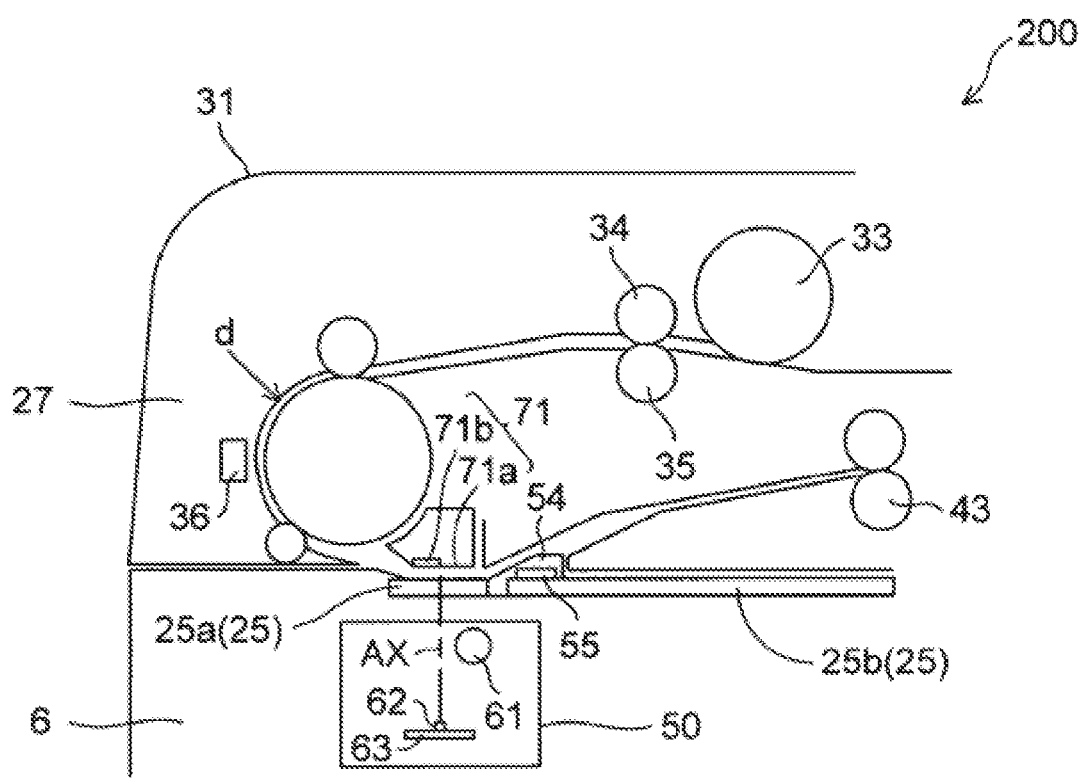
FIG. 3 is an explanatory diagram in which an internal structure of the image reading apparatus is enlarged.

FIG. 2 is a perspective view illustrating the appearance of the image reading apparatus 200 according to the present embodiment, and FIG. 3 is an explanatory diagram in which an internal structure of the image reading apparatus 200 is enlarged. On the upper surface of the image reading unit 6 of the image reading apparatus 200, the contact glass 25 including a glass for automatic reading 25a and a glass for hand-placed document 25b is arranged. A reading unit 50 is disposed inside the image reading unit 6. The reading unit 50 reads the image of the document placed on the glass for hand-placed document 25b while moving in the sub-scanning direction (the left-right direction in FIGS. 2 and 3) (fixed document reading system). Further, the reading unit 50 reads an image of the document fed by the document feeder 27 in a state where the reading unit 50 is stopped immediately below the glass for automatic reading 25a (fed document reading).

The reading unit 50 is constituted by a CIS (Contact Image Sensor) type reading module. More specifically, the reading unit 50 includes an illumination unit 61 as a light source for illuminating the document on the contact glass 25, a light receiving sensor 62 for receiving light reflected from the document by the illumination of the illumination unit 61 through an optical system (for example, a condenser lens) not shown, and a substrate 63 for holding the light receiving sensor 62. The light receiving sensor 62 is, for example, constituted by a CMOS sensor. The reading unit 50 is in contact with the back surface (the surface opposite to the facing member) of the contact glass 25 through a slider (not shown).

Here, an axis passing through the light receiving sensor 62 and perpendicular to the substrate 63 is referred to as a scanning optical axis AX. The illumination unit 61 is positioned so as to illuminate the document on the contact glass 25 from one side of the sub-scanning direction with respect to the scanning optical axis AX.

A feeding guide 54 for scooping up the front end of the document fed by the document feeder 27 is arranged at the end of the glass for hand-placed document 25b on the side of the glass for automatic reading 25a. A white reference plate 55 for shading correction of the reading unit 50 is disposed under the feeding guide 54. For example, before reading a document, the white reference plate 55 is read by the reading unit 50 to obtain a white reference, and the black reference is obtained in a state in which the illumination unit 61 of the reading unit 50 is turned off, so that shading correction is performed based on obtained white reference and black reference. This shading correction corrects variations in illumination in the main scanning direction of the illumination unit 61 of the reading unit 50.

In a cover member 31 of the document feeder 27, a document feeding path d extending from the document feeding tray 29 to a document discharge tray 32 is formed, and a document feeding member including a pickup roller 33, a paper feed roller 34, a separation roller 35, and a pair of discharge rollers 43 is provided along the document feeding path d. The document feeding path d is curved so as to be inverted between the nip portions of the paper feed roller 34 and the separation roller 35 and the glass for automatic reading 25a. The document feeding path d is provided with a document detection sensor 36 for detecting the presence or absence of the document and the passage of the front end or the rear end of the document.

Further, the document feeder 27 is provided with a facing member 71. The facing member 71 is fixed to a position facing the reading unit 50 in the document feeder 27 during fed document reading (sheet-through system). The document fed by the document feeder 27 goes through between the facing member 71 and the reading unit 50. From this, it can be said that the facing member 71 is located at a position opposed to the reading unit 50 via the feeding path of the document fed by the document feeder 27 during the fed document reading.

The facing member 71 has a white portion 71a having a white surface and a gray portion 71b having a gray surface. The white portion 71a is made of a white resin, and the gray portion 71b is made of a gray seal or paint. Therefore, the facing member 71 can be constituted by attaching the gray seal or applying the gray paint to a part of the white resin. In this case, the gray portion 71b is positioned on the surface of the facing member 71 having the white portion 71a so as to overlap a part of the white portion 71a. In the present embodiment, the gray portion 71b is embedded in the white portion 71a so as to be flush with the white portion 71a (see FIG. 3).

The white portion 71a and the gray portion 71b of the facing member 71 are arranged in the feeding direction of the document fed by going through between the facing member 71 and the reading unit 50, as viewed from the side of the reading unit 50, that is, arranged in the sub-scanning direction in which the reading unit 50 can move. More specifically, in the sub-scanning direction, when a side on which the illumination unit 61 is located with respect to the above-described scanning optical axis AX of the reading unit 50 is defined as a downstream side in the document feeding direction and an opposite side is defined as an upstream side, the white portion 71a of the facing member 71 is disposed at the downstream side in the sub-scanning direction with respect to the gray portion 71b. That is, the white portion 71a of the facing member 71 is on the same side as the side where the illumination unit 61 is located with respect to the scanning optical axis AX of the reading unit 50 in the sub-scanning direction, with respect to the gray portion 71b.

Since the gray portion 71b and the white portion 71a of the facing member 71 are aligned in the document feeding direction, the reading unit 50 can selectively perform normal reading and auto-crop reading by moving in the sub-scanning direction (switching the reading position) by a moving mechanism 83a as described later (see FIG. 4). Here, the normal reading is a method of reading an image of the document with the white portion 71a of the facing member 71 as a background. On the other hand, the auto-crop reading is a method of reading the image of the document with the gray portion 71b of the facing member 71 as a background. For example, the reading unit 50 can perform normal reading with the white portion 71a as a background by movement of the reading unit 50 by the moving mechanism 83a so that the scanning optical axis AX passes through the white portion 71a. On the other hand, the reading unit 50 can perform auto-crop reading with the gray portion 71b as the background by movement of the reading unit 50 by the moving mechanism 83a so that the scanning optical axis AX passes through the gray portion 71b.

Figure 4:
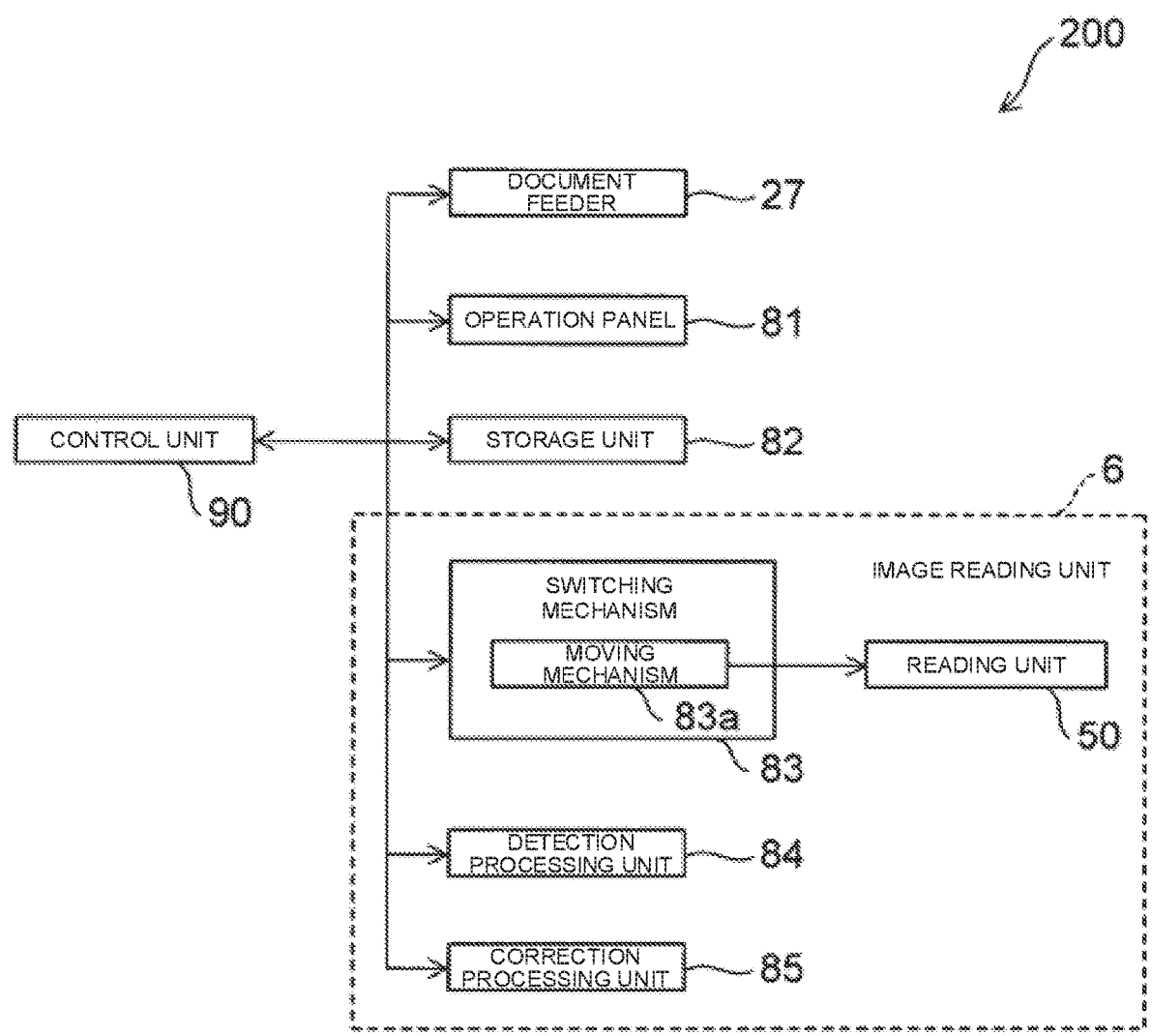
FIG. 4 is a block diagram illustrating a configuration of a main part of the image reading apparatus.

FIG. 4 is a block diagram illustrating the configuration of the main part of the image reading apparatus 200. The image reading apparatus 200 further includes an operation panel (operation unit) 81, a storage unit 82, a switching mechanism 83, a detection processing unit 84, a correction processing unit 85, and a control unit 90. The control unit 90 is constituted by a CPU for controlling operations of each part of the image reading apparatus 200 and the image forming apparatus 100, and operates in accordance with an operation program stored in the storage unit 82.

The operation panel 81 is, for example, a liquid crystal display device with a touch panel, and functions as an operation unit for receiving a setting input from the outside.

The storage unit 82 is a memory for storing an operation program of the control unit 90 and various data, and is configured by a ROM, a RAM, a hard disk, a portable storage medium, and the like, which are appropriately selected. The data stored in the storage unit 82 includes the read image data obtained by reading the image of the document by the image reading unit 6.

The switching mechanism 83 switches the position of the reading unit 50 between a position for the normal reading (see FIG. 5) and a position for the auto-crop reading (see FIG. 6) in response to a setting input by the operation panel 81. The switching mechanism 83 includes the moving mechanism 83a for moving the reading unit 50 in the sub-scanning direction.

The moving mechanism 83a includes a motor, gears, rails, and the like, and moves the reading unit 50 upstream or downstream in the sub-scanning direction.

The detection processing unit 84 performs area detection processing for detecting an area of the document with respect to the read image obtained by the reading unit 50 reading the image of the document against the background of the facing member 71. Such detection processing unit 84 is constituted by a CPU different from the CPU of the control unit 90, but may be constituted by the same CPU as the CPU of the control unit 90.

In the present embodiment, the detection processing unit 84 performs the area detection processing only in the auto-crop reading. For example, in the auto-crop reading, when the reading unit 50 reads the image of the document with the gray portion 71b of the facing member 71 as the background, the area of the document has the color of the base of the document, and the area other than the document (background area) has the color of the gray portion 71b, so that these areas have densities different from each other. Based on this density difference, the detection processing unit 84 can detect the area of the document from the read image, by distinguishing the area from the background area.

The correction processing unit 85 corrects any black line generated in the sub-scanning direction of the read image due to the adhesion of foreign matter on the surface of the contact glass 25 (glass for automatic reading 25a) on which the document is fed by the document feeder 27. The correction processing unit 85 is constituted by a CPU different from the CPU of the detection processing unit 84 and of the control unit 90, but may be constituted by the same CPU as the CPU of at least one of these units. The details of the correction processing by the correction processing unit 85 will be described later.

Operation of Image Reading Apparatus
(Fixed Document Reading)

In the above configuration, in the fixed document reading system, first, the document is placed on the glass for hand-placed document 25b with its surface facing downward. When the user presses a copy start button on the operation panel 81 of the image forming apparatus 100, the reading unit 50 is moved at a predetermined speed from the scanner home side (the left side in FIG. 3) to the scanner return side (the right side in FIG. 3) while the image surface of the document is illuminated by the illumination unit 61 of the reading unit 50. As a result, the light reflected by the image surface becomes image light and forms an image on the light receiving sensor 62. Thus, the light receiving sensor 62 acquires data (read data) of the read image. The data is temporarily stored in the storage unit 82 and used for image formation in the image forming unit 3.

(Fed Document Reading)

On the other hand, in the fed document reading system (normal reading, auto-crop reading), a plurality of document sheets are set on the document feeding tray 29 with the image surface facing upward. Thereafter, when the copy start button of the operation panel 81 is pressed, the lift plate (not shown) raised by the elevating mechanism (not shown) pushes up the pickup roller 33 through the document. As a result, the weight of the frame (not shown) including the pickup roller 33 is applied to the lift plate, so that the upper surface of the document is pressed against the pickup roller 33 at a predetermined pressure (sheet feeding pressure).

Some upper ones of the document sheets set in the document feeding tray 29 are fed to a nip portion between the paper feed roller 34 and the separation roller 35 by the pickup roller 33. Then, only the uppermost one sheet of the plurality of document sheets is separated by the separation roller 35 and fed toward the glass for automatic reading 25*a*. The document fed on the glass for automatic reading 25*a* is read by the reading unit 50. More details are as follows.

Figure 5:
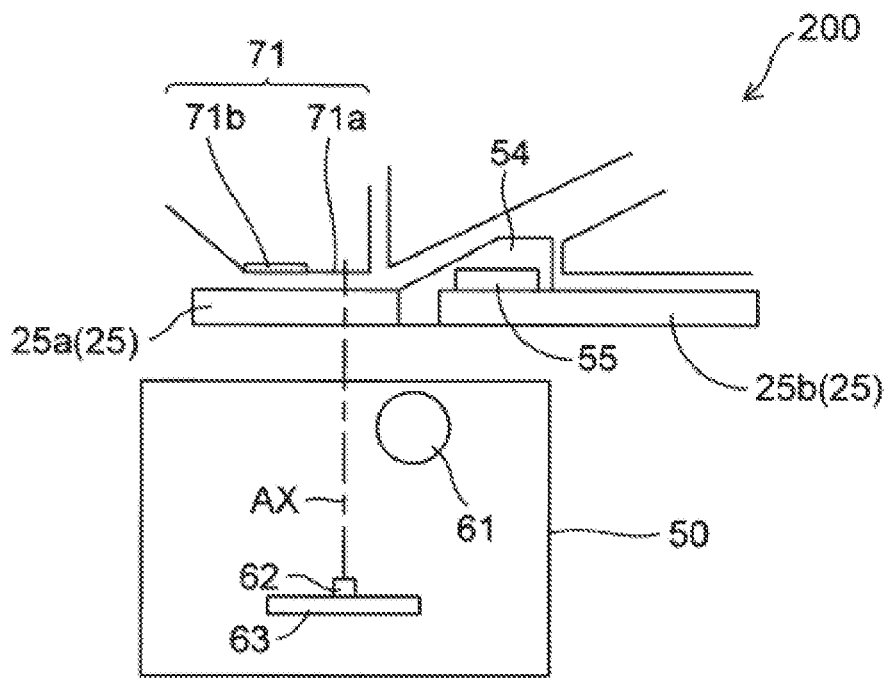
FIG. 5 is an explanatory diagram illustrating a position of a reading unit of the image reading apparatus in normal reading.
Figure 6:
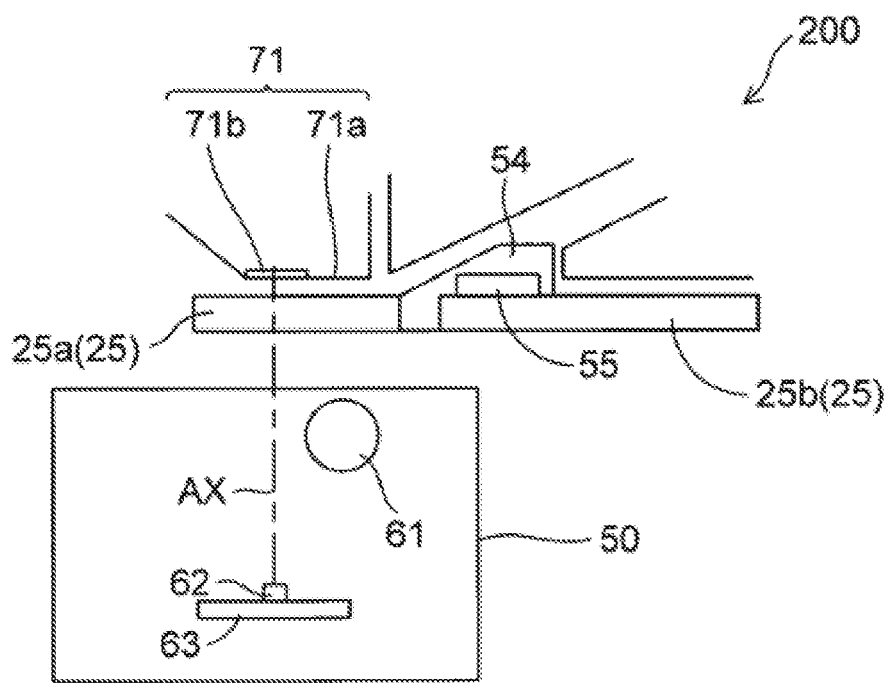
FIG. 6 is an explanatory diagram illustrating a position of the reading unit in auto-crop reading.

FIG. 5 illustrates the position of the reading unit 50 in the normal reading, and FIG. 6 illustrates the position of the reading unit 50 in the auto-crop reading. When "normal reading" is set by the operation panel 81 or by default, the moving mechanism 83*a* moves the reading unit 50 to the normal reading position. That is, as illustrated in FIG. 5, the moving mechanism 83*a* moves the reading unit 50 in the sub-scanning direction so that the scanning optical axis AX passes through the white portion 71*a* of the facing member 71.

In normal reading, the reading unit 50 starts reading an image at a timing when the front end of the document reaches the reading position between the reading unit 50 and the facing member 71, based on the result of detecting the front end of the document by the document detection sensor 36. Based on the result of the detection of the document rear end by the document detection sensor 36, the reading unit 50 ends the image reading at the timing when the rear end of the document has finished passing through the reading position. In the normal reading, the detection processing unit 84 does not perform area detection processing for detecting a document area from a read image.

The image reading in the normal reading is performed by illuminating, by the illumination unit 61 of the reading unit 50, the surface of the document, which is fed by the document feeder 27 and passes over the glass for automatic reading 25*a*, and by receiving the image light reflected by the image surface on the light receiving sensor 62. The data of the read image acquired by the light receiving sensor 62 is temporarily stored in the storage unit 82 and used for image formation in the image forming unit 3.

On the other hand, when "auto-crop reading" is set by the operation panel 81, the moving mechanism 83*a* moves the reading unit 50 to the auto-crop reading position. That is, as illustrated in FIG. 6, the moving mechanism 83*a* moves the reading unit 50 in the sub-scanning direction so that the scanning optical axis AX passes through the gray portion 71*b* of the facing member 71.

In the auto-crop reading, the reading unit 50 starts reading an image before the front end of the document reaches the reading position, based on the result of detecting the front end of the document by the document detection sensor 36. Then, the reading unit 50 reads the image until after the rear end of the document passes the reading position, based on the result of the detection of the rear end of the document by the document detection sensor 36. The image reading is performed by the illumination of the document by the illumination unit 61 and the light reception of the image light by the light reception sensor 62, just as in the normal reading. Thereafter, the detection processing unit 84 performs the above-described area detection processing, based on the density difference between the document area and the background area of the read image, and sets the detected document area as accurate document area data.

The document whose image has been read by the normal reading or the auto-crop reading is fed toward the pair of discharge rollers 43 via the feeding guide 54, and is finally discharged onto the document discharge tray 32 by the pair of discharge rollers 43. Thereafter, the above-described operation is repeated every time the image of one document sheet is completely read.

As described above, in the fed document reading system, the reading unit 50 selectively performs the normal reading and the auto-crop reading, and the detection processing unit 84 performs the area detection processing only in the auto-crop reading. In the normal reading, since the area detection processing is not performed, the time required for the area detection processing can be reduced to avoid a decrease in productivity in the continuous reading. That is, the efficiency of continuous reading can be improved.

In the normal reading, since the reading unit 50 reads the document image with the white portion 71*a* of the facing member 71 as the background, even when the document size is smaller than the reading size (for example, when the document size is A5 size and the reading size is A4 size), an area other than the document in the read image is white (a color obtained by reading the white portion 71*a*), and it is possible to avoid unnecessary background coloring other than white. As a result, it is possible to reduce wasteful consumption of toner in an area other than the document during printing based on the read image.

On the other hand, in the auto-crop reading, the reading unit 50 reads the document image with the gray portion 71*b* of the facing member 71 as the background. Therefore, even if the document size is smaller than the reading size, for example, the detection processing unit 84 can properly detect the document area by clearly distinguishing the document area and the background area (gray area) in the read image. Therefore, even when a difference occurs between the document feeding speed and the reading timing due to the influence of the thickness and the surface condition of the document, the document area can be accurately read, and a high-quality image can be obtained by preventing the defect of the document area. In addition, since the data to be stored in the storage unit 82 can be limited to the data of the document area from among the data of the read image, an increase in the amount of data to be stored can be avoided (an inexpensive storage unit 82 with a small storage capacity can also be used).

Further, the moving mechanism 83*a* functions as the switching mechanism 83 for switching the position of the reading unit 50 between a position for the normal reading and a position for the auto-crop reading by moving the reading unit 50 in the sub-scanning direction in response to a setting input by the operation panel 81. Thus, by operating the operation panel 81, the user can set whether the fed document reading is performed by the normal reading or the auto-crop reading, and the reading unit 50 can execute the reading (normal reading or auto-crop reading) corresponding to the setting input.

The gray portion 71*b* and the white portion 71*a* of the facing member 71 are aligned along the sub-scanning direction (horizontal direction in FIG. 3) as viewed from the side of the reading unit 50. In such an arrangement of the gray portion 71b and the white portion 71a, the moving mechanism 83a moves the reading unit 50 in the sub-scanning direction, so that the position of the reading unit 50 can be easily switched between a position where auto-crop reading is performed with the gray portion 71b as the background and a position where normal reading is performed with the white portion 71a as the background.

In the present embodiment, the white portion 71a of the facing member 71 is located downstream of the gray portion 71b in the sub-scanning direction. For example, if the gray portion 71b of the facing member 71 is located downstream of the white portion 71a in the sub-scanning direction, the gray portion 71b is closer to the illumination unit 61 than the white portion 71a is. In this case, at the time of illumination in the normal reading with the white portion 71a as the background, light (scattered light) from the illumination unit 61 is incident on and absorbed by the gray portion 71b, and the background of the document to be read becomes dark, and the read image itself becomes dark. To avoid this phenomenon, it is necessary to increase the width of the white portion 71a in the sub-scanning direction (or to position the white portion 71a away from the gray portion 71b by a predetermined distance in the sub-scanning direction) for normal reading. However, this measure increases the size of the facing member 71 in the sub-scanning direction, and the arrangement space thereof also increases in the sub-scanning direction.

When the white portion 71a of the facing member 71 is located on the downstream side of the gray portion 71b in the sub-scanning direction (closer to the illumination unit 61 than the gray portion 71b is), light from the illumination unit 61 can be efficiently incident on the white portion 71a during illumination in normal reading, and incidence of the light on the gray portion 71b can be reduced. This makes it possible to lighten the background of the document to be read, thereby preventing the read image itself from being darkened. Therefore, it is possible to avoid enlargement of the facing member 71 in the sub-scanning direction and to realize space saving of the arrangement of the facing member 71. Further, it is not necessary to greatly move the reading unit 50 in the sub-scanning direction, and the moving mechanism 83a can be prevented from being enlarged.

The gray portion 71b is positioned on the surface of the facing member 71 having the white portion 71a so as to overlap a part of the white portion 71a. Since the facing member 71 having such a configuration can be realized by attaching a gray seal or applying a gray paint to the white surface of the facing member 71, as described above, the facing member 71 having the gray portion 71b and the white portion 71a can be easily realized.

[Correction of Black Line]

Figure 7:
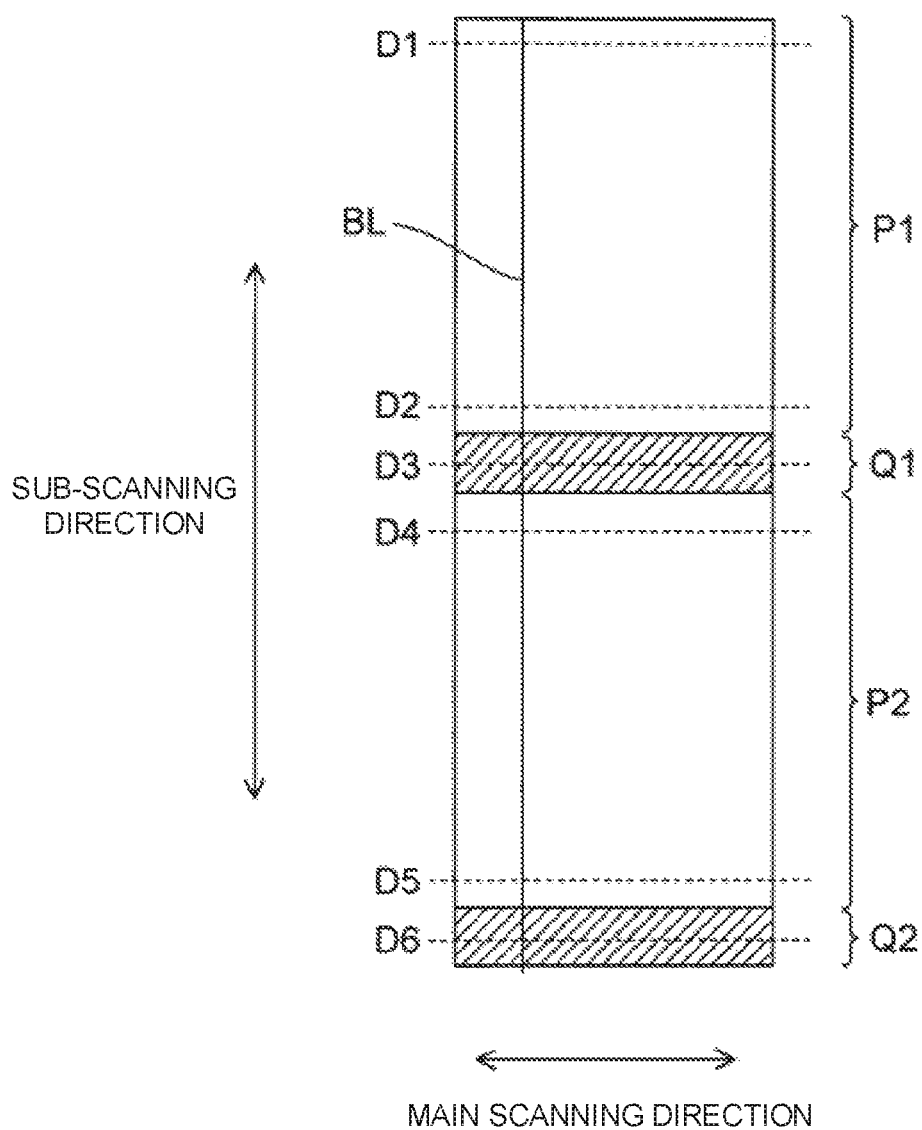
FIG. 7 is an explanatory diagram schematically illustrating a read image read by the auto-crop reading.

FIG. 7 schematically illustrates a read image read by auto-crop reading.

In FIG. 7, P1 represents a document area of the document's first sheet in the read images, P2 represents a document area of the document's second sheet in the read images, Q1 represents an inter-document area between the document area P1 and the document area P2, and Q2 represents an inter-document area between the document area P2 and the document area of the document's third sheet (not shown). The inter-document areas Q1 and Q2 are areas (areas having gray data) obtained by reading the gray portion 71b of the facing member 71.

When a foreign substance adheres to the glass for automatic reading 25a, the image of the document is read through the foreign matter in the fed document reading, so that black pixels caused by the foreign substance appear in the read image, and that a black line BL in which the black pixels are continuous in the sub-scanning direction appear. In view of this, in the auto-crop reading, the correction processing unit 85 (see FIG. 4) of the image reading apparatus 200 determines whether or not the positions of the black pixels in the main scanning direction in the read image of the document (for example, the document area P1) and in the image (for example, the inter-document area Q1) obtained by reading the gray portion 71b of the facing member 71 are identical with each other, and if they are identical with each other, corrects the black line BL by correcting the data of the black pixels in the image of the document.

For example, the correction processing unit 85 detects the positions of black pixels in the main scanning direction at the detection position D1 on the front end side of the document area P1, the detection position D2 on the rear end side of the document area P1, and the detection position D3 of the inter-document area Q1, and when these detection positions of the black pixels in the main scanning direction are identical with each other, the image data of a black pixel in the document area P1 is replaced with the average of the image data of adjacent two pixels in the main scanning direction, or with the image data of adjacent one pixel in the main scanning direction. Similarly, the correction processing unit 85 detects the positions of the black pixels in the main scanning direction at the detection position D4 on the front end side of the document area P2, the detection position D5 on the rear end side of the document area P2, and the detection position D6 in the inter-document area Q2, and when these positions of the black pixels in the main scanning direction are identical with each other, the image data of a black pixel in the document area P2 is replaced with the average of the image data of adjacent two pixels in the main scanning direction, or with the image data of adjacent one pixel in the main scanning direction.

If the read image data is, for example, 8 bit image data of 0 (black) to 255 (white), whether or not a pixel is a black pixel can be determined by determining whether or not the image data is equal to or less than a threshold value (for example, 10). In addition, the detection positions of the black pixels may be at least two positions, i.e., one position in any of the document areas (for example, in the document area P1) and another position in any of the inter-document areas (for example, in the inter-document area Q1). When the detection position of the black pixels in the document area in the main scanning direction is identical with the detection position of the black pixels in the inter-document area in the main scanning direction, the black line BL may be corrected by correcting the black pixels in the entire document area.

As described above, the correction processing unit 85 detects black pixels in the document image read by the auto-crop reading and corrects black lines, thereby improving the image quality of the read image.

If, for example, a black portion is provided instead of the gray portion 71b of the facing member 71, the inter-document areas Q1 and Q2 become black. In this case, since the density difference between the document area P1 and the inter-document area Q1 is increased, the detection of the document area P1 from the read image becomes easier. However, when the inter-document area Q1 becomes black, the inter-document area Q1 overlaps the color of the black pixels caused by the foreign matter. This makes it difficult to detect black pixels in the inter-document area Q1, and makes it difficult to correct the black line BL. Therefore, by providing the gray portion 71b (not the black portion) in the facing member 71, it is possible to reliably perform the two operations to detect the document area and to correct the black lines in the auto-crop reading.

When the correction processing unit 85 detects the black lines BL, a notification (display) for prompting the user to clean the glass may be made on the operation panel 81.

On the other hand, in the normal reading, the correction processing unit 85 may correct the black line BL by correcting the data of the black pixels in the image of the document when the positions of the black pixels in the main scanning direction are identical between in the read image of the document and in the image obtained by previously reading the white portion 71a of the facing member 71 outside the normal reading period. By doing this, even in the normal reading, black lines caused in the read image due to the foreign matter can be corrected to improve the image quality of the read image. The correction of the data of the black pixels in the normal reading can be performed using the data of the adjacent pixels in the main scanning direction, similarly to the correction of black pixels in the auto-crop reading.

In addition to the correction of the image data by the correction processing unit 85, the correction of the black lines BL in the auto-crop reading and the normal reading can also be performed, for example, by the moving mechanism 83a shifting the reading unit 50 in the sub-scanning direction so that the reading unit 50 can read an image while avoiding the foreign matter on the glass.

Other Embodiments

The facing member 71 described in the present embodiment may have the gray portion 71b and the white portion 71a on the front and back surfaces. In this case, by reversing (rotating) the front and rear surfaces of the facing member 71 between the normal reading and the auto-crop reading, the reading unit 50 can selectively execute the normal reading or the auto-crop reading without moving the reading unit 50 in the sub-scanning direction. However, in this configuration, it is necessary to provide the document feeder 27 with a mechanism for reversing the facing member 71, and there is a concern that the document feeder 27 may become large (particularly, the thickness thereof may increase).

As in the present embodiment, from the side of the reading unit 50, the gray portion 71b and the white portion 71a of the facing member 71 are positioned side by side in the sub-scanning direction, and the moving mechanism 83a moves the reading unit 50 in the sub-scanning direction, so that the reading unit 50 can selectively perform normal reading or auto-crop reading without providing the document feeder 27 with a mechanism for reversing the facing member 71. Therefore, the facing member 71 (see FIG. 3, etc.) described in the present embodiment is more advantageous than the configuration having the gray portion 71b and the white portion 71a on the front and back surfaces in that it is possible to avoid an increase in size (increase in thickness) of the document feeder 27.

It should be noted that the description of the above embodiment shows one aspect of the image forming apparatus according to the present disclosure, and the technical scope of the present disclosure is not limited to the above embodiments. The present disclosure may be variously modified, substituted or modified without departing from the spirit of the technical idea, and the claims include all embodiments which may be included within the scope of the technical idea.

The invention claimed is:

1. An image reading apparatus comprising:
   a document feeder that feeds a document;
   a reading unit that includes an image sensor type reading module to read an image of the document fed by the document feeder;
   a facing member that is positioned to face the reading unit via a feeding path of the document;
   a detection processing unit that is constructed by a CPU to perform area detection processing for detecting an area of the document with respect to a read image obtained by the reading unit reading the image of the document with the facing member as a background,
   an operation panel that receives a setting input from outside; and
   a switching mechanism that switches a position of the reading unit in accordance with the setting input by the operation panel,
   wherein
   the facing member has a white portion in which a surface is white and a gray portion in which a surface is gray,
   the reading unit selectively performs normal reading for reading the image of the document with the white portion of the facing member as the background, and auto-cropping reading for reading the image of the document with the gray portion of the facing member as the background,
   the switching mechanism switches the position of the reading unit between a position where the normal reading is performed and a position where the auto-cropping reading is performed, in accordance with the setting input by the operation panel, and
   the detection processing unit performs the area detection processing only in the auto-crop reading among the normal reading and the auto-crop reading.

2. The image reading apparatus according to claim 1, wherein
   the switching mechanism is configured by a moving mechanism that moves the reading unit in a sub-scanning direction,
   the facing member is provided on the document feeder, and
   the gray portion and the white portion of the facing member are arranged side by side in the sub-scanning direction as viewed from a side of the reading unit.

3. The image reading apparatus according to claim 2, wherein
   the reading unit includes:
   an illumination unit that includes a light source to illuminate the document;
   a light receiving sensor configured to receive reflected light from the document by illumination of the illumination unit; and
   a substrate holding the light receiving sensor, and wherein
   when an axis passing through the light receiving sensor and perpendicular to the substrate is defined as a scanning optical axis, the illumination unit illuminates the document from one side in the sub-scanning direction with respect to the scanning optical axis, and
   when a side on which the illumination unit is positioned with respect to the scanning optical axis in the sub-scanning direction is set to be a downstream side and an opposite side is set to be an upstream side, the white portion of the facing member is located downstream of the gray portion in the sub-scanning direction.

4. The image reading apparatus according to claim 1, wherein
the gray portion is located on a surface of the facing member having the white portion, and overlaps with a part of the white portion.

5. The image reading apparatus according to claim 1, further comprising
a correction processing unit that is constructed by the CPU to correct a black line generated in a sub-scanning direction of the read image by adhering of a foreign matter on a glass surface to which the document is fed,
wherein in the auto-crop reading, the correction processing unit corrects the black line by correcting data of black pixels in the image of the document when a position of the black pixels in the main scanning direction in the read image of the document is identical with a position of the black pixels in the main scanning direction in an image obtained by reading the gray portion of the facing member.

6. The image reading apparatus according to claim 5, wherein
in the normal reading, the correction processing unit corrects the black line by correcting the data of the black pixels in the image of the document when the positions of the black pixels in the main scanning direction are identical between in the read image of the document and in the image obtained by reading the white portion of the facing member outside a period of the normal reading.

7. An image forming apparatus comprising:
the image reading apparatus according to claim 1; and
an image forming device that functions together with the image reading apparatus to form an image on a recording medium, based on read data obtained by reading an image of the document by the image reading apparatus.

8. An image reading apparatus comprising:
a document feeder that feeds a document;
a reading unit that includes an image sensor type reading module to read an image of the document fed by the document feeder;
a facing member that is positioned to face the reading unit via a feeding path of the document;
a detection processing unit that is constructed by a CPU to perform area detection processing for detecting an area of the document with respect to a read image obtained by the reading unit reading the image of the document with the facing member as a background, and
a correction processing unit that is constructed by the CPU to a black line generated in a sub-scanning direction of the read image by adhering of a foreign matter on a glass surface to which the document is fed,
wherein
the facing member has a white portion in which a surface is white and a gray portion in which a surface is gray,
the reading unit selectively performs normal reading for reading the image of the document with the white portion of the facing member as the background, and auto-cropping reading for reading the image of the document with the gray portion of the facing member as the background,
the detection processing unit performs the area detection processing only in the auto-crop reading among the normal reading and the auto-crop reading, and
in the auto-crop reading, the correction processing unit corrects the black line by correcting data of black pixels in the image of the document when a position of the black pixels in the main scanning direction in the read image of the document is identical with a position of the black pixels in the main scanning direction in an image obtained by reading the gray portion of the facing member.

* * * * *